United States Patent Office 2,870,174
Patented Jan. 20, 1959

2,870,174

CYCLOPENTANOPHENANTHRENE DERIVATIVES AND METHOD FOR THE PRODUCTION THEREOF

Carl Djerassi, Birmingham, Mich.

No Drawing. Application June 2, 1955
Serial No. 512,869

Claims priority, application Mexico June 18, 1954

10 Claims. (Cl. 260—397.4)

The present invention relates to a novel method for the production of $\alpha,\beta$-unsaturated $\gamma$-iodo-ketones.

More particularly, the present invention relates to the production of $\alpha,\beta$-unsaturated, $\gamma$-iodo-ketones by reaction of the corresponding enol acylates with a positive iodine compound preferably N-iodosuccinimide.

The production of steroidal $\alpha,\beta$-unsaturated $\gamma$-iodo-ketones forms a useful part of a novel process for the production of steroidal hormones especially the known hormone 17$\alpha$-hydroxyprogesterone as will hereinafter be set forth.

In the United States application of Djerassi and Lenk, filed June 17, 1954, there is disclosed a method for the production of $\alpha$-iodo-ketones by reaction of an enol ester with N-iodosuccinimide. In this application there is further disclosed that N-iodosuccinimide reacts selectively with double bonds of the enolic type.

In accordance with the present invention the surprising discovery has been made that N-iodosuccinimide under mild conditions reacts with enol esters of certain $\alpha,\beta$-unsaturated ketones. It has further been discovered that this reaction may be selectively performed without any substantial reaction with the enol esters derived from saturated ketone groupings.

There has further been provided therefore a novel process, involving novel intermediates, for the production of the hormone 17$\alpha$-hydroxy-progesterone starting from easily available progesterone. More specifically, the novel process just mentioned involves the selective reaction of the di-enol acylate of progesterone with N-iodosuccinimide to form a novel acylate of 6-iodo-$\Delta^{4,17(20)}$-pregnadien-20-ol-3-one, which is subjected to the action of a reducing agent for the production of the corresponding novel acylate of $\Delta^{4,17(20)}$-pregnadien-20-ol-3-one. This novel intermediate is then subjected to epoxidation preferably with an aromatic peracid followed by rearrangement in alkaline medium of the 17,20-epoxido compound to form the 17$\alpha$-hydroxyprogesterone.

The following equation serves to illustrate broadly the process of the present invention:

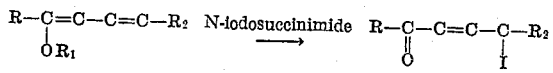

In the above equation R may be hydrogen or R and $R_2$ together may represent two of the carbon atoms of a carbocyclic compound such as a compound including a steroid nucleus. Further, if R is hydrogen, then $R_2$ may represent an organic radical preferably a saturated or unsaturated steroid nucleus. In such case the nucleus may contain other double bonds in various positions or may be substituted. $R_1$ represents a lower fatty acid acyl group.

The present method is especially suitable for the production of 17$\alpha$-hydroxy-progesterone from progesterone according to the following equation:

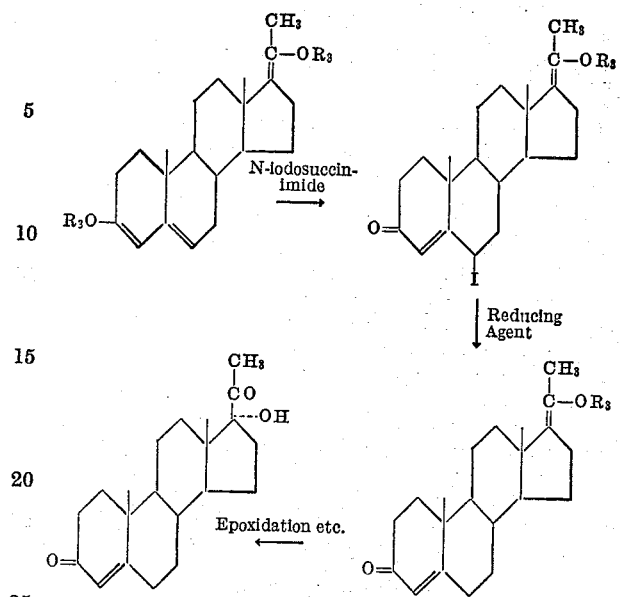

In the above equation $R_3$ represents an acyl group preferably that derived from a lower fatty acid such as acetic or propionic.

In practicing the process above outlined, the di-enol lower fatty acid acylate of progesterone (which may be made from progesterone in conventional manner by reaction of a lower fatty acid anhydride, such as acetic anhydride, in the presence of p-toluenesulfonic acid) is dissolved in a suitable inert organic solvent such as dioxane. N-iodosuccinimide is then added in the amount approximately equal to that of the di-enol acylate, the solution is heated slightly to dissolve the reagent, and is then kept standing at room temperature for a substantial period of time, as for example 24 hours. Preferably in order to achieve the selective reaction above set forth, temperatures are utilized of less than 30° C., and the time of reaction should be limited to less than approximately two days. In place of N-iodosuccinimide other positive iodine compounds may be utilized such as N-iodoacetamide or iodine chloride, for example. However, N-iodosuccinimide is preferred. The reaction mixture at the end of the reaction is then diluted with potassium iodide solution, decolorized with sodium bisulfite solution and the precipitate filtered and washed with water. A high yield is obtained of the lower fatty acylate such as the acetate of 6-iodo-$\Delta^{4,17(20)}$-pregnadiene-20-ol-3-one.

In the second step of the above-indicated process, the 6-iodo compound is treated with a reducing agent for the removal of the 6-iodine. For this step the 6-iodo compound is dissolved in a suitable organic solvent such as chloroform and is treated as for example for several hours with sodium bisulfite. Other known reducing agents can be used such as chromous chloride, zinc, etc.

In the last stage of the process the enol acylate is subjected to epoxidation using conventional reagents such as an aromatic peracid, as for example monoperphthalic acid or monoperbenzoic acid. The epoxy ketone formed is then treated under reflux conditions with a base such as potassium hydroxide in methanol in order to rearrange and hydrolyze the epoxy ketone formed. Upon neutralization and recrystallization 17$\alpha$-hydroxy progesterone is obtained in high yield.

The following specific examples serve to illustrate but are not intended to limit the present invention:

*Example 1*

0.5 g. of N-iodosuccinimide was added to a solution of 0.5 g. of the diacetate of $\Delta^{3,5,17(20)}$-pregnatriene-3,20-diol (di-enol acetate of progesterone) melting point 117–123° C., prepared from progesterone by reaction with acetic anhydride in the presence of p-toluenesulfonic acid) in 5 cc. of dioxane. The solution was heated slightly to dissolve the reagent and then it was kept standing at room temperature for 24 hours. The mixture was diluted with potassium iodide solution, decolorized with sodium bisulfite solution and the precipitate was filtered and washed with much water. There was obtained a nearly quantitative yield of the acetate of 6-iodo-$\Delta^{4,17(20)}$-pregnadiene-20-ol-3-one, having a melting point of 80–87° C., of sufficient purity to be used for the reduction described in Example II.

*Example II*

A solution of 300 mg. of the acetate of 6-iodo-$\Delta^{4,17(20)}$-pregnadiene-20-ol-3-one in 30 cc. of chloroform was stirred for several hours with 50 cc. of a 10% aqueous solution of sodium bisulfite. The chloroform layer was separated, well washed with water, dried and evaporated, leaving as a residue 0.2 g. of the acetate of $\Delta^{4,17(20)}$-pregnadiene-20-ol-3-one, which showed infrared absorption maxima at 5.85 $\mu$ (enol acetate and 6.0 $\mu$ ($\alpha,\beta$-unsaturated ketone). Alternatively, this deiodination can be carried out with other known reducing agents such as chromous chloride, zinc, etc.

*Example III*

0.16 g. of the enol acetate obtained in accordance with Example II was dissolved in 10 cc. of chloroform, mixed with 0.75 cc. of a 2 normal solution of monoperphthalic acid and the mixture was kept overnight at room temperature. Next day, the solution was washed with aqueous sodium iodide solution, sodium thiosulfate and water, dried over anhydrous sodium sulfate and evaporated to dryness. The residue was refluxed for 15 minutes with a 0.8 normal solution of potassium hydroxide in methanol in order to rearrange and hydrolyze the epoxy-ketone formed. The solution was neutralized by the cautious addition of acetic acid and concentrated to a small volume, thus giving 17$\alpha$-hydroxyprogesterone which after one recrystallization from acetone had the correct melting point of 218–219° C. On direct comparison (mixed melting point and infrared spectrum) the compound was to be identical to an authentic sample.

I claim:
1. A method for the preparation of the lower fatty acid acylate of 6-iodo-$\Delta^{4,17(20)}$-pregnadiene-20-ol-3-one which comprises reacting the di-lower fatty acid acylate of $\Delta^{3,5,17(20)}$-pregnatriene-3,20-diol with N-iodosuccinimide at a temperature below 30° C.

2. A method for the preparation of 17$\alpha$-hydroxy progesterone which comprises reacting the lower fatty acid di-acylate of $\Delta^{3,5,17(20)}$-pregnatriene-3,20-diol with N-iodosuccinimide at a temperature below 30° C. to form the corresponding acylate of 6-iodo-$\Delta^{4,17(20)}$-pregnadiene 20-ol-3-one, treating the 6-iodo compound thus formed with a reducing agent to remove the iodine therefrom and form the lower fatty acid acylate of $\Delta^{4,17(20)}$-pregnadiene-20-ol-3-one, treating the last-mentioned compound with aromatic peracid to form an epoxide and finally hydrolytically rearranging the 17,20-epoxide thus formed in alkaline medium.

3. The method for preparation of the acetate of $\Delta^{4,17(20)}$-pregnadiene-20-ol-3-one which comprises reacting the acetate of 6-iodo-$\Delta^{4,17(20)}$-pregnadiene-20-ol-3-one with sodium bisulfite.

4. A method for the preparation of 17$\alpha$-hydroxy progesterone which comprises expoxidizing the 20-monoenol acetate of progesterone by treating the same with an aromatic peracid, and thereafter subjecting the 17,20-epoxido-3-ketone thus formed to hydrolytic rearrangement in alkaline medium.

5. The lower fatty acid acylate of 6-iodo-$\Delta^{4,17(20)}$-pregnadiene-20-ol-3-one.

6. The acetate of 6-iodo-$\Delta^{4,17(20)}$-pregnadiene-20-ol-3-one.

7. The lower fatty acid acylate of $\Delta^{4,17(20)}$-pregnadiene-20-ol-3-one.

8. The acetate of $\Delta^{4,17(20)}$-pregnadiene-20-ol-3-one.

9. A method for the selective preparation of a 6-iodo-$\Delta^4$-3-keto pregnene compound which comprises reacting the corresponding dienol ester with a positive iodine compound at a temperature below 30° C.

10. The method of claim 9 wherein the positive iodine compound is N-iodosuccinamide.

References Cited in the file of this patent
UNITED STATES PATENTS
2,677,695    Oliveto _____ May 4, 1954